(12) United States Patent
Wang et al.

(10) Patent No.: US 12,540,652 B2
(45) Date of Patent: Feb. 3, 2026

(54) RATCHET SPRING

(71) Applicant: STANLEY BLACK & DECKER MEA FZE, Dubai (AE)

(72) Inventors: Tseng Sheng Wang, Taichung (TW); Yu-Wei Tsai, Taichung (TW)

(73) Assignee: STANLEY BLACK & DECKER MEA FZE, Dubai (AE)

( * ) Notice: Subject to any disclaimer, the term of this patent is extended or adjusted under 35 U.S.C. 154(b) by 446 days.

(21) Appl. No.: 18/162,159

(22) Filed: Jan. 31, 2023

(65) Prior Publication Data
US 2023/0243398 A1  Aug. 3, 2023

(30) Foreign Application Priority Data

Jan. 31, 2022  (EP) .................................... 22154181

(51) Int. Cl.
| F16F 1/44 | (2006.01) |
| F16F 1/373 | (2006.01) |
| F16F 1/377 | (2006.01) |

(52) U.S. Cl.
CPC ............ F16F 1/445 (2013.01); F16F 1/3732 (2013.01); F16F 1/377 (2013.01); *F16F 2230/0029* (2013.01); *F16F 2232/04* (2013.01)

(58) Field of Classification Search
CPC .................................. F16F 1/324; F16F 1/326
USPC ........................................................ 267/161
See application file for complete search history.

(56) References Cited

U.S. PATENT DOCUMENTS

| 4,285,054 A * | 8/1981 | McNeel ................. G01V 1/181 |
| | | 367/187 |
| 4,323,994 A * | 4/1982 | Coogler ................. G01V 1/181 |
| | | 367/187 |
| 8,476,809 B2 * | 7/2013 | Chen ................... H03H 9/02244 |
| | | 331/154 |
| 2003/0086751 A1 * | 5/2003 | Culpepper .............. F16F 1/027 |
| | | 403/52 |
| 2005/0045456 A1 | 3/2005 | Muroi et al. |

(Continued)

FOREIGN PATENT DOCUMENTS

| DE | 8812685 U1 | 11/1988 |
| FR | 2411480 B1 | 6/1981 |

OTHER PUBLICATIONS

Extended European Search Report dated Jul. 11, 2022, issued in Application No. EP22154181.6.

*Primary Examiner* — Melanie Torres Williams
(74) *Attorney, Agent, or Firm* — Jordan IP Law, LLC; Todd A. Vaughn

(57) ABSTRACT

A spring configured to be fixed to a housing and nested within a dial that is rotatable about the spring. The dial has a plurality of spaced apart inwardly facing teeth that are adjacent the spring. The spring is configured to facilitate rotation of the dial about the spring. The spring includes a central body having at least one anchor configured to connect the spring to the housing. The spring also includes at least one arm having a first end connected to the central body. The spring also includes a second end of the arm that is connected to a bulb. The bulb can be enclosed and include an exterior surface with a node that is on distal from the central body. The node is sized to fit in a space between adjacent teeth. The enclosed bulb biases the node toward the spaces between the teeth.

20 Claims, 3 Drawing Sheets

(56) References Cited

U.S. PATENT DOCUMENTS

2006/0254362 A1* 11/2006 Luharuka ............... G01H 13/00
                                                                                              73/649
2011/0064964 A1* 3/2011 Shu ........................ F16D 3/79
                                                                                              428/600
2012/0103765 A1    5/2012 Worones et al.

* cited by examiner

RATCHET SPRING

This patent application claims priority to EP Application 22154181.6 filed Jan. 31, 2022, which is hereby incorporated by reference in its entirety.

FIELD OF THE INVENTION

The present invention relates to a spring. More particularly, the present invention relates to a ratchet spring that is suitable for use tools such as in a multimeter.

BACKGROUND OF THE INVENTION

Multimeters are well known devices. They are used by myriad professionals to measure resistance, voltage and current. To toggle between these different uses, multimeters typically include a dial that can be rotated. A spring is often positioned beneath the dial to facilitate such rotation. Multimeters are often used in spaces that are rife with debris such as dust, soot and oil. Under these conditions, it is not uncommon for debris to get lodged between the dial and the spring. When this occurs, rotation of the dial can become difficult or, even worse, the dial can seize, and rotation of the dial can become impossible.

The present invention addresses one or more of the aforementioned problems by problems by providing a ratchet spring configured to be fixed to a housing and nested within a dial that is rotatable about the spring. The dial has a plurality of spaced apart inwardly facing teeth that are adjacent the spring. The spring is further configured to facilitate rotation of the dial about the spring. The spring includes a central body having at least one anchor configured to fix the spring to the housing. The spring also includes at least one arm least one arm having a first end connected to the central body. The spring is characterized in that it further includes a second end of the arm that is connected to an enclosed bulb. The enclosed bulb includes an exterior surface with a node that is on distal from the central body. The node is sized to fit in a space between adjacent teeth. The enclosed bulb biases the node toward the spaces between the teeth.

SUMMARY OF THE INVENTION

An object of the present invention is to solve the problem with other multimeter to prevent or mitigate debris lodged between the dial and the spring.

It is another object of the present invention to obviate or mitigate at least one disadvantage of common multimeter.

In accordance with one aspect of the present invention, there is a spring configured to be fixed to a housing and nested within a dial that is rotatable about the spring, wherein said dial includes a plurality inwardly facing teeth having a space therebetween, and wherein said spring is further configured to facilitate rotation of the dial about the spring, said spring comprises a central body having at least one anchor configured to fix the spring to the housing; at least one arm having a first end connected to the central body; and wherein a second end of the arm is connected to an enclosed bulb having an exterior surface with a node that is on distal from the central body, and wherein said node is sized to fit in a space between adjacent teeth, and wherein the enclosed bulb biases the node toward the spaces between the teeth.

This implementation of the invention, may be desired, because the structure and arrangement allow for less difficulty in dial rotations as result of reduced debris.

The terminology used herein is for the purpose of describing implementations or embodiments only and is not intended to be limiting of the invention. As used herein, the singular forms, "a", "an" and "the" are intended to include the plural forms as well, unless the context clearly indicates otherwise. It will be further understood that the root terms "can", "include", "can include", "may", and/or "have", when used in this specification, specify the presence of stated features, steps, operations, elements, and/or components, but do not preclude the presence or addition of at least one other feature, step, operation, element, component, and/or groups thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

For definitional purposes and as used herein "connected" or "attached" includes operation or physical, whether direct or indirect, affixed or coupled, as for example, the spring is to an enclosed bulb. Thus, unless specified, "connected" or "attached" is intended to embrace any operationally functional and/or utility connection.

As used herein "substantially," "generally," "slightly" and other words of degree are relative modifiers intended to indicate permissible variation from the characteristic so modified. It is not intended to be limited to the absolute value or characteristic which it modifies but rather possessing more of the physical or functional characteristic than its opposite, and preferably, approaching or approximating such a physical or functional characteristic.

In the following description, reference is made to accompanying drawings which are provided for illustration purposes as representative of specific exemplary embodiments in which the invention may be practiced. Given the following description of the specification and drawings, the apparatus and methods should become evident to a person of ordinary skill in the art. Further areas of applicability of the present teachings will become apparent from the description provided herein. It is to be understood that other embodiments can be utilized and that structural changes based on presently known structural and/or functional equivalents can be made without departing from the scope of the invention.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying and drawings.

Corresponding reference characters indicate corresponding parts throughout the several views. The exemplifications set out herein illustrate embodiments of the present invention, and such exemplifications are not to be construed as limiting the scope of the present invention in any manner.

DETAILED DESCRIPTION OF THE DRAWINGS

A detailed description of apparatuses, methods, and systems, consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Figure 1:
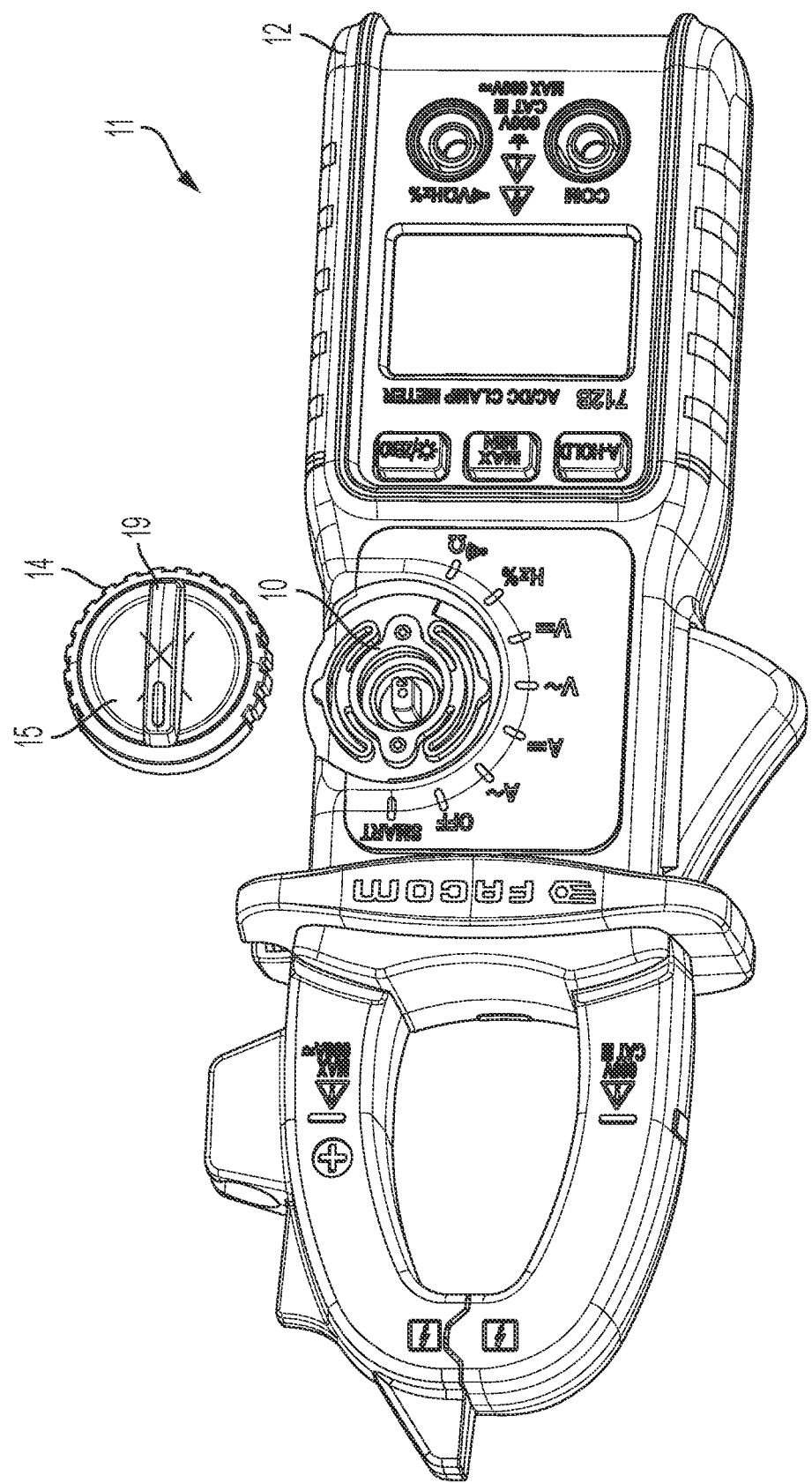
FIG. 1 is a perspective view of a multimeter with a spring according to the present invention.

Referring to FIGS. 1-3B there is described and illustrated a plurality of figures of one embodiment of a multimeter including a spring. Turning to FIG. 1 there is illustrated an example of a multimeter 11 used to measure resistance, current and voltage. The multimeter includes a housing 12 and a dial 14. Underneath the dial 14, the multimeter 11 further includes a spring 10. The spring 10 is configured to be fixed to the housing 12 and nested within the dial 14. The dial 14 has an obverse side 15, which can be seen in FIG. 1, and a reverse side 17, which is best seen in FIG. 2B. The obverse side 15 typically contains a handle 19, which is configured to allow a user to rotate the dial 14 to a desired selection. The reverse side 17 includes a plurality of inwardly facing teeth 16 having a space 23 therebetween. The spring 10 that is nested within the dial 14 is configured to limit debris from getting lodged in the spaces 23 between the teeth 16.

Figure 2B:
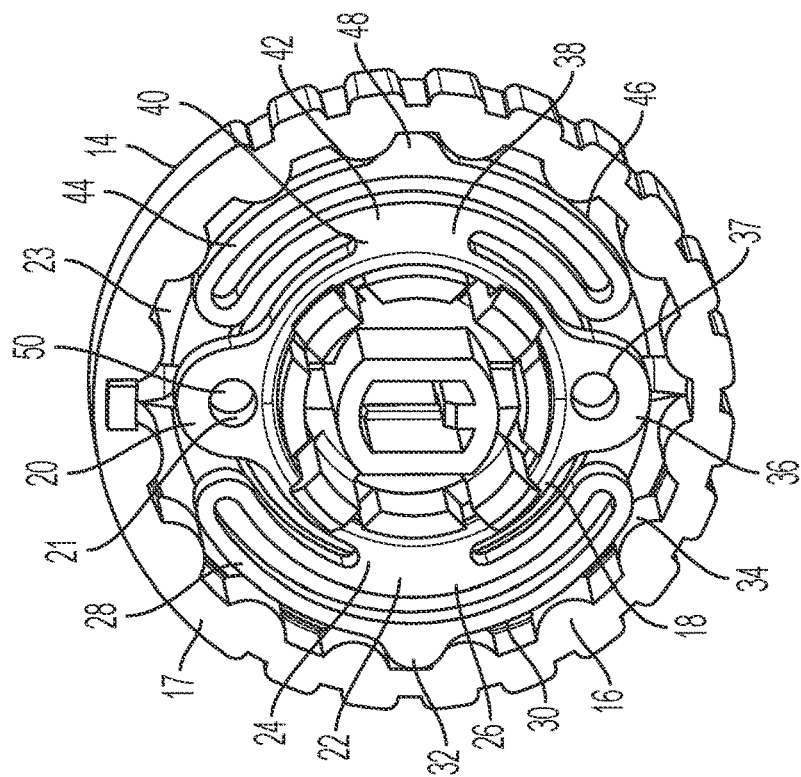
FIG. 2b is a perspective view of the spring according to the present invention nested within a dial.
Figure 2A:
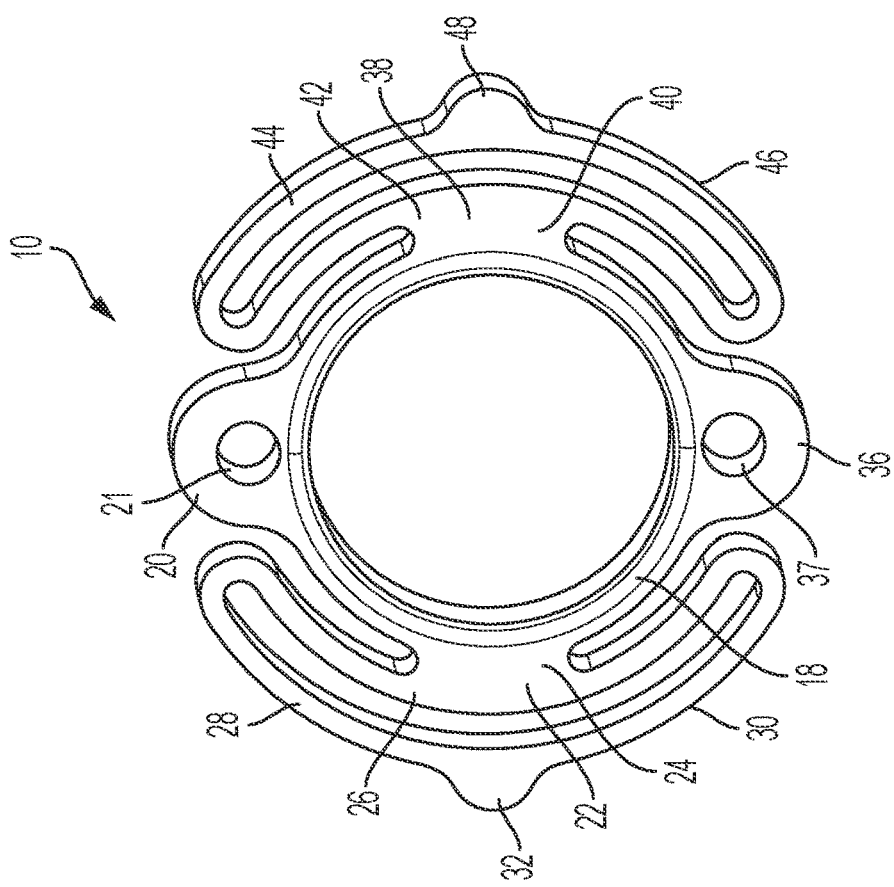
FIG. 2a is a perspective view of the spring according to the present invention.

As best seen in FIGS. 2A and 2B, the spring 10 includes a central body 18 that includes at least on one anchor 20 configured to fix the spring 10 to the housing 12. The spring 10 further includes at least one arm 22 extending radially from the central body 18. The arm 22 includes a first end 24 connected to the central body 18. The arm 22 further also includes a second end 26 that is connected to an enclosed bulb 28. The enclosed bulb 28 includes an exterior surface 30 having a node 32. The node 32 is distal from the central body 18. The node is sized to fit in a space between adjacent teeth on the reverse side 17 of the dial 14. Additionally, the enclosed bulb 28 biases the node 32 toward the spaces 23 between the teeth 16. The enclosed bulb 28 is sized such that when the node 32 is disposed in a space 23 between adjacent teeth 16, the exterior surface 30 engages a surface 34 of several teeth 16 such that the exterior surface 30 blocks access to the spaces 23 between several teeth 16.

In a preferable embodiment, the spring 10 may further include a second anchor 36 that is also configured to fix the spring 10 to the housing 12. Similarly, the spring 10 may also include a second arm 38 that extends away from the central body 18. Like the first arm 22, the second arm 38 also includes a first end 40 that is attached to the central body 18. The second arm 38 also includes a second end 42 that is attached to a second enclosed bulb 44. Like the first enclosed bulb 28, the second enclosed bulb 42 also includes an exterior surface 46 having a node 48. The node 48 is distal from the central body 18. The node 48 is also sized to fit in a space 23 between adjacent teeth 16. The second enclosed body 44 biases the node 48 toward the spaces 23 between the teeth 16. The second enclosed bulb 44 is sized such that when the node 48 is disposed in a space 23 between adjacent teeth 16, the exterior surface 46 engages a surface 34 of several teeth 16, and the exterior surface 46 blocks access to the spaces 23 between several teeth 16.

In yet another preferable embodiment, at least one the exterior surface 30, 46 of either the first or second enclosed bulb 28, 44 is in contact with an anchor 20, 36. More preferably, both exterior surfaces 30, 46 are in contact with both anchors 20, 36. Those skilled in the art will recognize that the anchors 20, 36 may include an orifice 21, 37 that are configured to receive a prong 50 affixed to the housing. In use, the preferred embodiment of the spring 10 is aligned within the housing 12 such that the prongs 50 are received by the orifices 21, 37, thereby holding the spring in place.

Figure 3B:
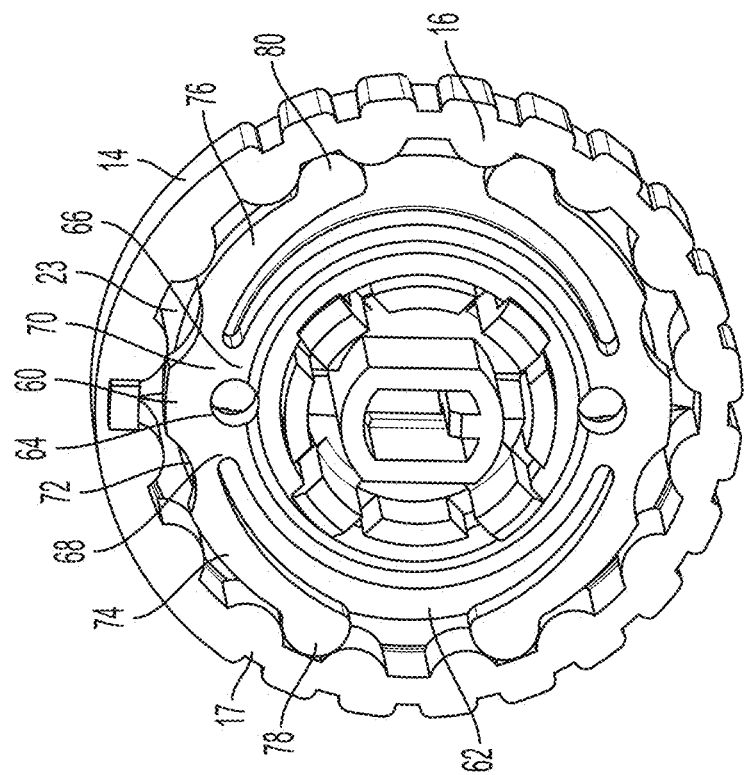
FIG. 3b is a perspective view of a spring according to the prior art nested within a dial.
Figure 3A:
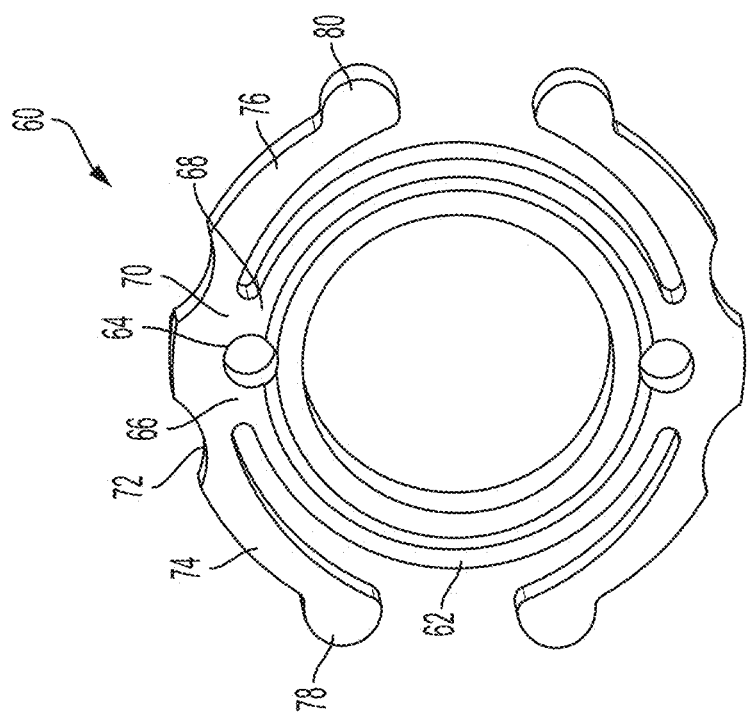
FIG. 3a is a perspective view of a spring according to the prior art

The operation of the ratchet spring 10 and its advantages over the prior art will now be discussed. Springs 60 of the prior art had the disadvantage of permitting debris between itself and the dial. This debris can cause the dial to seize making rotation difficult or impossible. As can be seen in FIGS. 3A and 3B, prior art springs 60 include a central body 62 having an anchor 64. Spring 60 further includes an arm 66 extending away from the central body 62. A first end 68 of the arm is attached to the central body 62, and a second end 70 is attached to a T-shaped stopper 72. The T-shaped stopper 72 has a first extension 74 and a second extension 76. Each extension further includes a bulb 78, 80. Bulbs 78, 80 are sized to fit within the spaces 23 of the multimeter 11 dial 14.

Those skilled in the art will recognize that a dial 14 on a multimeter 11 using the prior art spring 60 is susceptible to seizing due to debris. The T-shaped stopper 72 does little to prevent debris from entering the spaces 23 of dial 14. When debris gets lodged in these spaces 23, the bulbs 78, 80, which are positioned at the respective ends of the first and second extensions 74, 76 can prevent rotation of the dial. This is due to the fact that the debris prevents the bulbs 78, 80 from easily dislodging from the space and permitting the dial to rotate.

The spring 10 of the present invention solves this problem in two ways. First, the sizing and positioning of the enclosed bulbs 28, 44 work to prevent debris from getting into spaces 23. Secondly, the enclosed bulbs 28, 44 also permit a significant amount of axial movement of the nodes 32, 44. This axial movement allows the nodes 32, 48 to give a bit. Even if debris gets into the spaces 23, rotation of dial 14 causes its teeth 16 to push the nodes 32, 48 axially towards the central body 18. This movement facilitates rotation of the dial 14 about the spring 10.

While it is anticipated that the spring 10 will be in operational use with a multimeter 11, it is not limited and the spring 10 may be operationally used in other applications or products. It will be understood by one skilled in the art that the springs may be placed into other products as to reduce debris between components.

While certain features of the described implementations have been illustrated as described herein, many modifications, substitutions, changes and equivalents will now occur to those skilled in the art. It should be noted that the present invention may, however, be embodied or combined in many different forms and should not be construed as limited to the embodiments set forth herein; rather, the embodiments set forth herein are provided so that the disclosure will be thorough and complete, and will fully convey the scope of the invention to those skilled in the art. Furthermore, any steps and number of the various steps illustrated in the figures may be adjusted from that shown. The accompanying figures and attachments illustrate exemplary embodiments of the invention.

It is, therefore, to be understood that any claims and/or descriptions are intended to cover all such modifications and changes as fall within the scope of the implementations. It should be understood that they have been presented by way of example only, not limitation, and various changes in form and details may be made. Those skilled in the art will appreciate that various adaptations and modifications of the example and alternative embodiments described above can be configured without departing from the scope and spirit of the invention. Therefore, it is to be understood that, within the scope of the summaries and/or descriptions, the invention may be practiced other than as specifically described herein.

We claim:

1. A spring comprising:
   a construction configured to be fixed to a housing and nested within a dial that is rotatable about the spring, wherein said dial includes a plurality inwardly facing teeth having a space therebetween, and wherein said spring is further configured to facilitate rotation of the dial about the spring, said construction comprising:
   a central body having at least one anchor configured to fix the spring to the housing; and
   at least one arm extending radially along a radial axis from the central body, the at least one arm having a first end connected to the central body and a second end connected to an enclosed bulb having an exterior surface with a node extending radially along the radial axis from the exterior surface and distal from the central body, wherein said node is sized to fit in a space between adjacent teeth and is biased by the enclosed bulb toward the spaces between the adjacent teeth.

2. The spring of claim 1, wherein the enclosed bulb is sized such that when the node is disposed within a space between adjacent teeth, the exterior surface of the enclosed bulb engages a surface of several teeth such that the exterior surface blocks access to the spaces between said several teeth.

3. The spring of claim 1, further comprising a second anchor also configured to fix the spring to the housing.

4. The spring of claim 2, further comprising a second anchor also configured to fix the spring to the housing.

5. The spring of claim 1, further comprising a second arm having a first end connected to the central body and a second end connected to a second enclosed bulb also having an exterior surface with a node that is distal from the central body, wherein said node is sized to fit in a space between adjacent teeth and is biased by the second enclosed bulb toward the spaces between the adjacent teeth.

6. The spring of claim 2, further comprising a second arm having a first end connected to the central body and a second end connected to a second enclosed bulb also having an exterior surface with a node that is distal from the central body, wherein said node is sized to fit in a space between adjacent teeth and is biased by the second enclosed bulb the spaces between the adjacent teeth.

7. The spring of claim 5, wherein the second enclosed bulb is sized such that when the node is disposed within a space between the adjacent teeth, the exterior surface of the second enclosed bulb engages a surface of several teeth such that the exterior surface blocks access to the space between said several teeth.

8. The spring of claim 6, wherein the second enclosed bulb is sized such that when the node is disposed within a space between the adjacent teeth, the exterior surface of the second enclosed bulb engages a surface of several teeth such that the exterior surface blocks access to the space between said several teeth.

9. The spring of claim 1, wherein at least one exterior surface of an enclosed bulb is in contact with an anchor.

10. The spring of claim 2, wherein at least one exterior surface of an enclosed bulb is in contact with an anchor.

11. The spring of claim 3, wherein the anchors include orifices that are configured to receive a prong affixed to the housing.

12. The spring of claim 4, wherein the anchors include orifices that are configured to receive a prong affixed to the housing.

13. The spring of claim 5, wherein the enclosed bulbs are flexible.

14. The spring of claim 6, wherein the enclosed bulbs are flexible.

15. The spring of claim 1, wherein said spring is made of plastic.

16. The spring of claim 1, wherein the housing is a housing for a multimeter.

17. A spring comprising:
    a structure configured to be fixed to a housing and nested within a dial that is rotatable about the spring, wherein said dial includes a plurality inwardly facing teeth having a space therebetween, and wherein said spring is further configured to facilitate rotation of the dial about the spring, said structure comprising:
    a central body having at least one anchor configured to connect the spring to the housing; and
    at least one arm extending radially along a radial axis from the central body, the at least one arm having a first end connected to the central body and a second end connected to a bulb having an exterior surface with a node extending radially along the radial axis from the exterior surface and distal from the central body, wherein said node is sized to fit in a space between adjacent teeth and is biased by the bulb toward the spaces between the adjacent teeth.

18. The spring of claim 17, wherein the enclosed bulb is configured to permit axial movement of the node toward the central body.

19. The spring of claim 1, wherein the enclosed bulb is configured to permit axial movement of the node toward the central body.

20. A spring configured for positioning within a dial having a plurality inwardly facing teeth having a space between adjacent teeth, the spring comprising:
    a spring structure configured to facilitate rotation of the dial, the spring structure including:
    a central body,
    at least one arm extending radially along a radial axis from the central body, the at least one arm having a first end extending from the central body, and
    a bulb connected to a second end of the at least one arm, the bulb having a node extending radially along the radial axis from an exterior surface of the bulb which biases the node toward the space between the adjacent teeth to dispose the b node in the space when the spring is arranged in the dial and also cause engagement of the exterior surface of the bulb with a surface of the teeth to block access to the spaces between the teeth.

* * * * *